Patented Oct. 18, 1927.

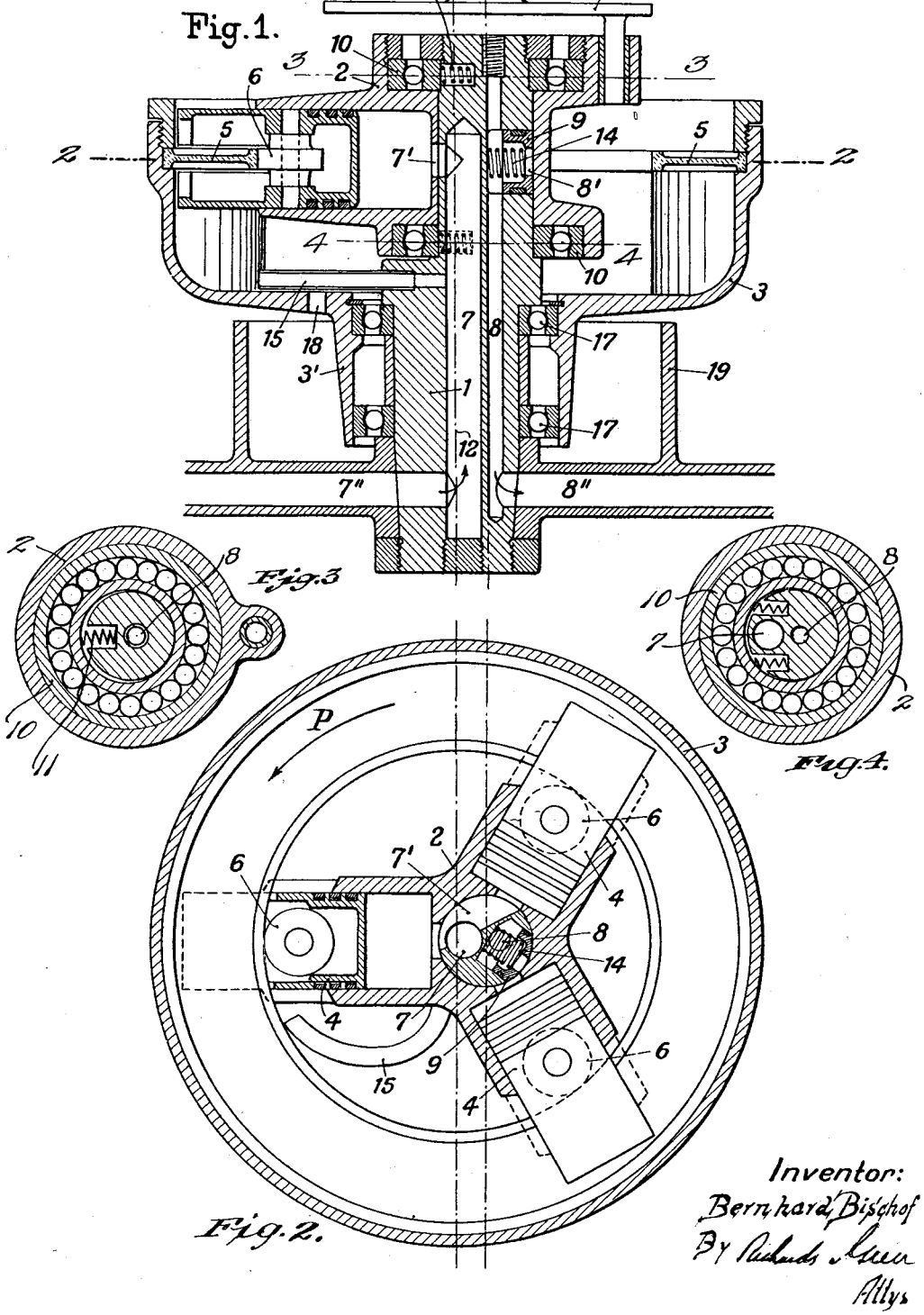

1,646,185

UNITED STATES PATENT OFFICE.

BERNHARD BISCHOF, OF GENEVA, SWITZERLAND.

ENGINE WITH ROTATING CYLINDERS ARRANGED RADIALLY.

Application filed October 2, 1924, Serial No. 741,111, and in Germany October 17, 1923.

This invention relates to engines with rotating cylinders arranged radially upon a stationary shaft containing the inlet and the outlet of the pressure medium, the outer ends of the pistons of said cylinders bear against a rotatable ring arranged eccentrically to the axis of rotation, the pistons moving to and fro in their cylinders under the action of centrifugal force and the ring.

The disadvantage of engines of this type is that at high speeds great losses due to friction and excessive wear take place. In the known engines the rotatable ring is supported by the casing of the engine, and therefore no exact cooperating of the pistons and the ring is possible. The resistance due to friction is however specially high on the stationary shaft which serves for the inlet and outlet of the pressure medium, and on which the cylinder frame with its bore has to fit in a suitable manner in order to make a satisfactory tight joint.

If the bore of the cylinder frame be made too large, friction is reduced it is true, but the control or distribution is unfavourably influenced because a satisfactory packing cannot be secured, so that high pressures, such as occur on the compression stroke of compressors, internal combustion motors and refrigerating machines, cannot be attained.

The object of the present invention is to obviate these disadvantages. In order to reach a favourable cooperating of the pistons and the ring, said ring is freely rotatably supported by the stationary shaft of the engine. Furthermore the cylinder frame is arranged with a slight amount of play on said stationary shaft by means of ball bearings, and springs are inserted between the inner ring of said ball bearings and said shaft; said springs are arranged opposite to the high pressure controlling channel.

The subject matter of the invention is shown by way of example in the drawing.

Figure 1 shows on the left hand side a vertical section through a compressor in which the packing on the stationary shaft is obtained by ball bearings placed under spring pressure. The right hand side of Figure 1 shows the packing as obtained by means of an auxiliary piston.

Figure 2 is a horizontal section on the line 2—2 of Figure 1.

Fig. 3 is a horizontal section substantially on the line 3—3 of Fig. 1, through the upper ball bearing of the cylinder star.

Fig. 4 is a horizontal section substantially on the line 4—4 of Fig. 1, through the lower ball bearing.

On the stationary shaft 1 are mounted and rotate the cylinders 2 which are arranged radially. The pistons 4 are seated freely in their cylinders and are pressed under the action of centrifugal force by means of anti-friction rollers 6 against a ring 5. This ring 5 is mounted eccentrically to the shaft 13 of the cylinder frame. The ring 5 is carried by a casing 3 which rotates by means of ball bearings 17 on the stationary shaft 1. The axis of rotation 12 of the ball bearings 17 coincides with the central axis of the ring 5.

The shaft 1 has two longitudinal borings 7 and 8 for the inlet and outlet of the pressure medium. From the boring 7 a controlling passage 7' leads to the outer surface of the shaft 1, while from the boring 8 a controlling passage 8' leads to the outer surface of the shaft 1. At the lower end the borings 7 and 8 communicate by means of passages 7'' and 8'' with a suction chamber and with a compression chamber respectively.

In order to make a tight joint between the side of the boring of the cylinder frame which lies on the pressure side (the right hand side in the drawing) and the outer surface of the stationary shaft the ball bearings 10 which carry the cylinder frame are provided with springs 11 on their opposite sides.

The cylinder frame is driven by means of a crank plate 16.

The engine works in the following manner:

The cylinder frame is set in rotation by means of the crank plate 16 in the direction indicated by the arrow P. As soon as it has attained a sufficient speed, the pistons 4 are thrust against the ring 5 by the action of centrifugal force. As the ring 5 lies eccentrically to the axis of rotation of the cylinder frame, the pistons will be moved to and fro in their cylinders when the cylinder frame rotates. They therefore draw the pressure medium from the passage 7'' and deliver it into the passage 8''.

I claim:

In an engine or compressor with rotating cylinders arranged radially, a stationary vertical and cylindrical shaft containing the passages for the inlet and the outlet and for the control of the pressure medium, a cylinder star being rotatably and freely arranged, with a slight amount of play, on said stationary shaft by means of ball bearings, said bearings consisting of an inner ring upon said stationary shaft, an outer ring in said cylinder star and a series of balls between said rings, springs between the inner ring of said ball bearings and said stationary shaft, said springs being arranged opposite to that passage which controls the high pressure and a ring eccentric to the axis of said cylinder star, the pistons of said cylinders bearing against said ring, and said ring being freely and rotatably supported by said shaft.

In testimony whereof I have hereunto set my hand.

BERNHARD BISCHOF.